United States Patent [19]
Peeters et al.

[11] Patent Number: 6,070,400
[45] Date of Patent: Jun. 6, 2000

[54] FORAGE WRAPPING DEVICE AND METHOD

[75] Inventors: Kenneth J. Peeters, Bear Creek; Gregory L. Landon, Shawano, both of Wis.

[73] Assignee: H&S Manufacturing Co., Inc., Marshfield, Wis.

[21] Appl. No.: 09/118,053

[22] Filed: Jul. 17, 1998

Related U.S. Application Data

[60] Provisional application No. 60/053,111, Jul. 18, 1997.

[51] Int. Cl.$^7$ ..................................................... B65B 11/00
[52] U.S. Cl. .............................................................. 53/588
[58] Field of Search ..................... 53/588, 210; 493/478; 100/27, 33 PB; 198/341.04, 468.8; 414/24.5, 24.6

[56] References Cited

U.S. PATENT DOCUMENTS

| | | |
|---|---|---|
| 1,235,312 | 7/1917 | Hadert . |
| 2,630,751 | 3/1953 | Cranston et al. . |
| 2,972,844 | 2/1961 | Ripley . |
| 4,050,220 | 9/1977 | Lancaster et al. . |
| 4,524,568 | 6/1985 | Lancaster et al. . |
| 4,594,836 | 6/1986 | Good . |
| 4,641,484 | 2/1987 | Popelka . |
| 4,793,124 | 12/1988 | Anderson . |
| 4,866,909 | 9/1989 | Lancaster, III et al. . |
| 5,012,631 | 5/1991 | Hostetler et al. . |
| 5,596,864 | 1/1997 | Reeves . |
| 5,661,956 | 9/1997 | Tardif . |

FOREIGN PATENT DOCUMENTS

| | | |
|---|---|---|
| 2192 172 | of 0000 | United Kingdom . |
| WO 86/01783 | 3/1986 | WIPO . |

OTHER PUBLICATIONS

Tube–Line Balewrapper, Model 500, color brochure, 2 pgs., not dated.
Webbs Industrial Group, Webco Helix Wrappers, color brochure, 2 pgs., not dated.
Anderson Machinery—In Line Wrapper, color brochure, 2 pgs., not dated.
Model 400 Tube–Line Wrapper, color brochure, 2 pgs., not dated.
Reeves In–Line Bale Wrap, Model 2552, brochure, 1 pg., not dated.
Tardif & Frére, brochure, 2 pgs., 1993.
Tube–Line Bale Wrapper, Models TL5500A & TL55, 2 pgs., not dated.
Baled Silage . . . Has Its Time Finally Come, Gary Burchfield, Prime Line, 3 pgs., Spring 1995.
H&S Auto–Wrap Bale Wrappers, color brochure, 4 pgs., not dated.
Kverneland Round Bale Wrappers, color brochure, 16 pgs., not dated.

*Primary Examiner*—John Sipos
*Assistant Examiner*—Steven Jensen
*Attorney, Agent, or Firm*—Patterson & Keough, P.A.

[57] ABSTRACT

A bale wrapper includes a frame with a leading end having steerable wheels and a transport pole connected to the steerable wheels, a trailing end with braked wheels, and a central portion. A bale-loading deck adjacent the leading end includes spaced-apart guide rails, tubular supports between the spaced-apart guide rails which define a standard path and an elevated path, and a hydraulically powered pushbar for translating a bale. A single centrally located hoop assembly has two opposed rolls of plastic film and is carried and supported by and between a first idler assembly mounted on one side of the frame and a second idler assembly mounted on the opposite side of the frame, the hoop assembly having an inner edge and a powered rubber wheel bearing against the inner edge. The bale wrapper includes a power source.

4 Claims, 4 Drawing Sheets

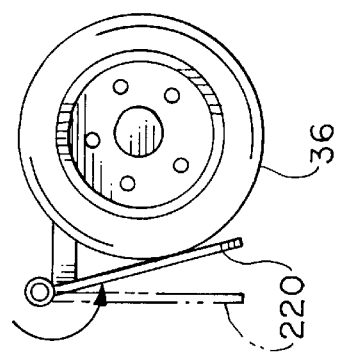
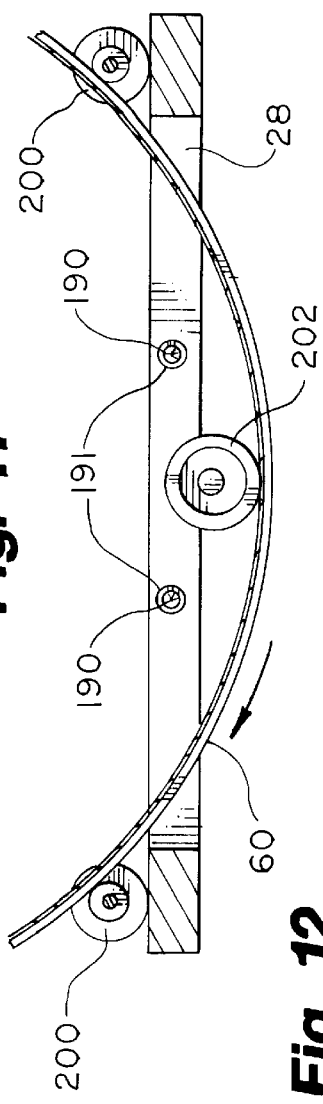
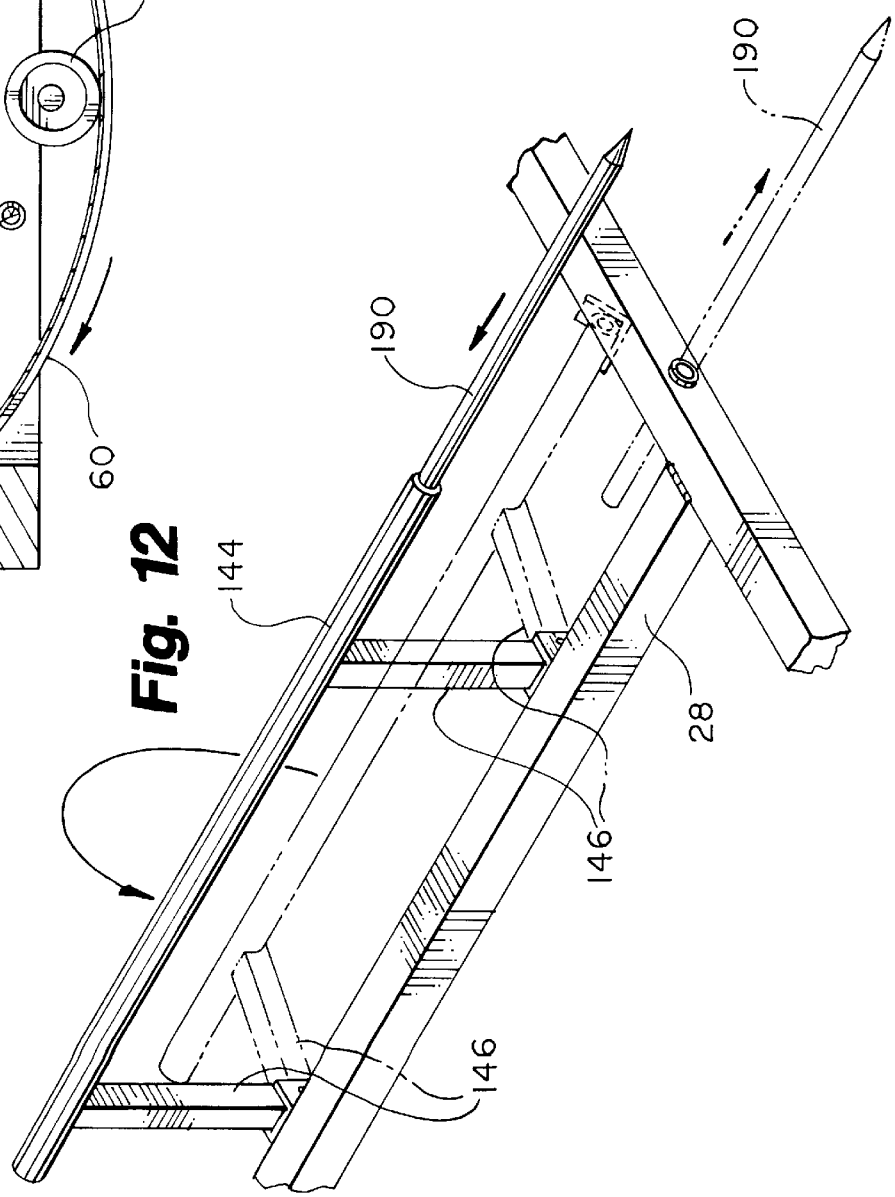

FORAGE WRAPPING DEVICE AND METHOD

RELATED APPLICATION

This application claims the benefit of U.S. Provisional Application No. 60/053,111, entitled FORAGE WRAPPING DEVICE AND METHOD, filed Jul. 18, 1997, the contents of which are herein incorporated by reference and priority to which is hereby claimed under 35 USC § 120.

BACKGROUND

The present invention relates to agricultural implements and, in particular, the present invention relates to forage wrapping devices, such as bale wrappers, and methods of preserving forage.

For many years it was a typical agricultural process to cut forage, allow some drying to occur, rake it into windrows for further drying, then collect and store the forage at a desirable moisture content. Handling and storage of the cut forage was simplified by baling. Over roughly the past generation, a shift has occurred in the sizing of the bales. Earlier bales could be lifted and carried by an individual. More modern bales are massive units (from several hundred to a thousand pounds) of tightly bound and compressed forage). Accompanying this shift has been a shift in storage from piles of smaller bales, often stored indoors or covered outdoors, to outdoor storage of individual large bales or rows of large bales. More recently, the large bales have been covered in plastic sheeting to protect them from rain and snow and reduce their exposure to oxygen. One approach is to use a large plastic bag to surround the large bale. Another is to use overlapping helical wraps of plastic sheeting. Noteworthy examples are the disclosures of Anderson in U.S. Pat. No. 4,793,124 and Reeves in U.S. Pat. No. 5,596,864.

The present invention provides a solution to wrapping a single large bale or more preferably a series of large bales. These bales are wrapped faster and more efficiently than the prior art wrapping devices allow. Other aspects of the present invention provide for versatility and fine adjustments in wrapping operations while improving the safety of operators.

SUMMARY OF THE INVENTION

The present invention involves an arrangement for wrapping large hay bales individually. More preferably a series of large bales may be advantageously wrapped. The present invention is an agricultural film wrapping apparatus or device. The wrapper includes a frame, with a leading end, a trailing end and a central portion. The frame is borne on leading and trailing pairs of wheels. The leading pair of wheels is pivotally steerable. A telescoped transport pole is connected to the steering mechanism. The transport pole may be retracted for coupling to a manual steering mechanism. The device includes a hydraulic push bar, with an extension mechanism for single or final bales. The pushbar includes an extension mechanism for a single bale or for a final bale of a series. The hydraulic pushbar interacts with detector switches. These detector switches may be adjustably located adjacent its stroke. These detector switches function to initiate or stop action of the pushbar and the wrapping hoop. The device includes safety and efficiency enhancing features. The bale wrapper may be operated manually or in automatic mode. Remote controls are optionally present. Wheel-applied brakes and brake fail-safe functions are provided to prevent towing while the brake is engaged.

In a preferred embodiment, the present invention is a bale wrapper. The bale wrapper includes a frame, a bale-loading deck, a central portion with a single hoop assembly, and a power source. The frame includes a leading end with steerable wheels and a transport pole connected to the steerable wheels. The frame also has a trailing end with braked wheels. A central portion is also present between the leading end and the trailing end. The bale-loading deck is located adjacent the leading end. The bale-loading deck includes a pair of spaced-apart guide rails, a pair of tubular supports located generally between the spaced-apart guide rails, the tubular supports are rotatably mounted to the frame by paired riser legs. This structure defines a standard path in first position and defines an elevated path in a second position. A hydraulically powered pushbar for translating a bale on either the standard path or the elevated path toward the trailing end is also present. A hoop assembly has two opposed rolls of plastic film and is carried and supported by and between a first idler assembly mounted on one side of the frame and a second idler assembly mounted on the opposite side of the frame. The hoop assembly has an inner edge and a powered rubber wheel bearing against the inner edge. The wrapper also includes an engine which provides a means to simultaneously power the hydraulic pushbar and rotate powered rubber wheel to rotate the hoop such that film is dispensed from the opposed rolls and wrapped about a bale being translated by the pushbar through the hoop. The bale wrapper preferably has a transport pole which is telescopic between an extended towing position and a retracted manual steering position, as well as a screw crank. The screw crank is mounted transversely on the frame adjacent the leading edge and is attachable to the transport pole to laterally pivot the transport pole such that an operator may steer the bale wrapper whilst the operator avoids occupancy in the wheel path being steered. The bale wrapper also preferably has three frame mounted switches to detect respectively, a forward travel limit position of the pushbar, a hoop assembly rotation initiation position of the pushbar, and a rearmost travel limit position of the pushbar.

BRIEF DESCRIPTION OF THE DRAWINGS

FIG. 11 is a sectional view at 11—11 of FIG. 6;

FIG. 12 is another fragmentary perspective view of portions adjacent the leading end of the wrapper of FIG. 1; and FIG. 13 is another fragmentary view of a trailing wheel of the wrapper of FIG. 1, depicting a brake engaged and disengaged (in phantom).

DETAILED DESCRIPTION OF THE PREFERRED EMBODIMENTS

Comprehension of the present invention can be gained through reference to the drawings in conjunction with a through review of the following explanation. By "forage" herein is meant not only food for livestock such as horses and cattle, such as hay, but also similar materials, such as straw, which might be used for bedding rather than food. By "longitudinally" oriented or "longitudinal" herein is meant generally parallel to the path of an object being wrapped and generally parallel to a line extending from the leading end to the trailing end of a wrapping device of the present invention. By "transverse" or "transversely" oriented herein is meant perpendicular to longitudinal.

Figure 1:
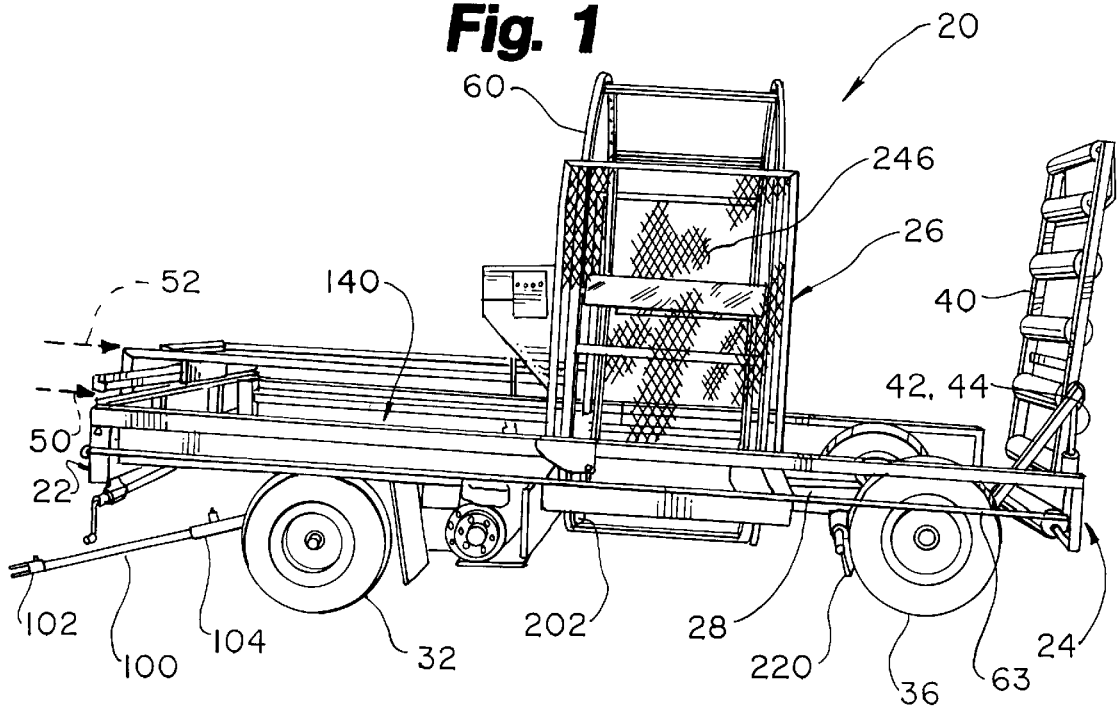
FIG. 1 is an elevated side perspective view of the present invention in transport position.
Figure 2:
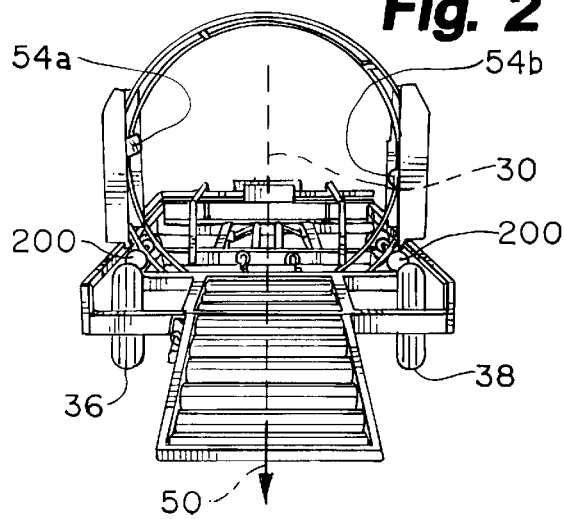
FIG. 2 is an elevated perspective view of the wrapper of FIG. 1 in a deployed position as viewed from above the trailing end.
Figure 3:
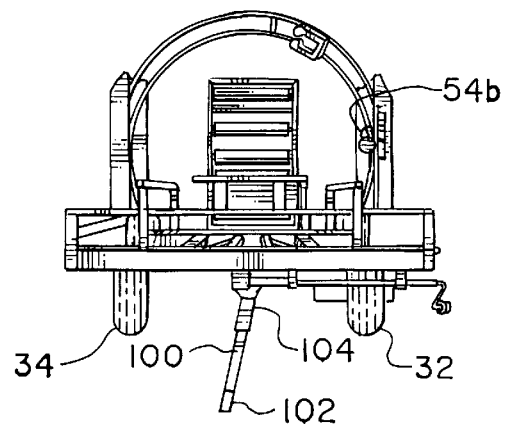
FIG. 3 is a perspective view of the leading end of the wrapper of FIG. 1, showing the telescopic transport pole in an extended position.

In a preferred embodiment of the present invention, a forage wrapping device, or more simply a bale wrapper, is depicted in FIG. 1 at 20. Wrapper 20 includes a leading end 22, a trailing end 24, and a central portion 26. Wrapper 20 also has a frame 28, which extends along longitudinal axis 30. In the preferred embodiment, frame 28 is inclined with leading end 22 higher than trailing end 24. Frame 28 is carried by four wheels: two steerable leading wheels 32, 34 and two trailing wheels 36, 38. Trailing end 24 has a ramp 40. Ramp 40 is hinged to the frame 28 and is hydraulically lifted and lowered by a ram and cylinder 42, 44, respectively. Ramp 40 carries a series of transversely mounted rollers.

Central portion 26 wraps plastic sheeting about objects traveling along a path 50 from leading end 22 through central portion 26 and onward to trailing end 24. The object to be wrapped may be a round hay bale, preferably with a diameter from about 4 feet to about 6 feet. Other bale shapes such as cubes or rectangular parallelpipeds may also be accommodated. Hay bales with maximum lengths of about 6 feet, 6 inches and maximum widths of about 5 feet may be wrapped when an elevated (raised) path 52 is provided. Wrapping occurs by simultaneously feeding continuous sheets from two opposed rolls 54*a*, 54*b* of plastic film. Rolls 54*a* and 54*b* are longitudinally oriented and are mounted on a single hoop assembly 60. Hoop assembly 60 rotates about its longitudinally oriented axis. Bales to be wrapped pass from leading end 22 to trailing end 24 of wrapper 20, and thus through the hoop assembly 60, either along path 50 or along elevated path 52, as discussed below. Hoop assembly 60 preferably has a forward and rearward hoop of preferably like diameters. The forward and rearward hoops of hoop assembly 60 are linked together, preferably by short struts. Most preferably, the forward and rearward hoops are separated by the struts such that plastic film rolls 54*a*, 54*b* can be carried between them. Forward and rearward hoops of hoop assembly 60 function together and might be alternatively described as a single cylindrical structure. Preferably, the diameter of the hoop assembly 60 is roughly equal to or slightly greater than the width of the wrapper 20 at wheels 32, 34 and 36, 38.

Leading End

Figure 4:
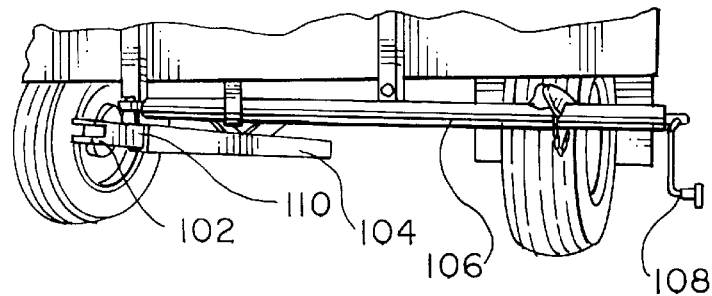
FIG. 4 is a fragmentary view of the leading end of the wrapper of FIG. 1 with the telescopic transport pole retracted and coupled to the manual steering assembly.
Figure 5:
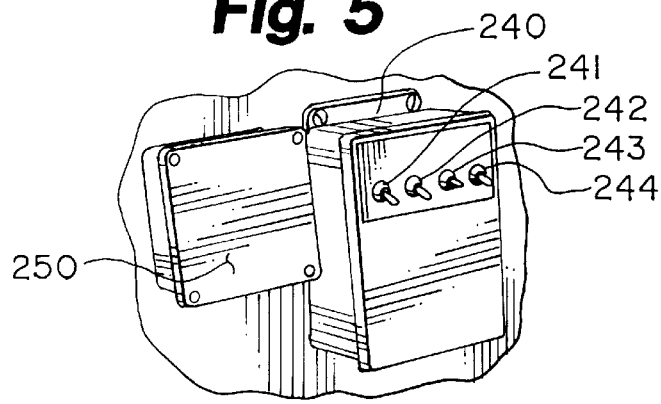
FIG. 5 is a fragmentary view of the control systems of the wrapper of FIG. 1.

Leading end 22 includes a telescopic transport pole 100. Transport pole 100 is connectable to a pulling vehicle (not shown) at a lead end connector 102. Through well known assemblies in this art, transport pole 100 is hingably coupled to a steering assembly 104 such that lead end connector 102 of transport pole 100 may be pivoted vertically without activating steering assembly 104. Steering assembly 104 is activated when lead end connector 102 of transport pole 100 is pivoted laterally. Pivoting pole 100 to the left causes the steering wheels 32 and 34 to pivot to the left, relative to longitudinal axis 30. Consequently, wrapper 20 turns to the left when traveling forward. Pivoting pole 100 right causes wheels 32, 34 to pivot to the right such that wrapper 20 turns to the right when traveling forward. When detached from a tow vehicle, transport pole 100 may be telescoped inwardly into a retracted position, such that lead end connector 102 is closer to leading end 22. When transport pole 100 is retracted, connector 102 may be detachably connected to screw/crank assembly 106. Screw/crank assembly 106 is attached to frame 28 at leading end 22 and oriented to laterally control the position of connector 102. The connector 102 then may be driven rightward or leftward, relative to the frame 28 and longitudinal axis 30 to steer the device 20. The manual steering capability is facilitated by attaching the leading end connector to a screw/crank assembly 106 mounted transversely and horizontally on the leading end 22. This arrangement is shown in FIG. 4. The screw /crank assembly 106 has a crank handle 108 and a connector 110. The connector 110 is temporarily connected to the connector 102 to transmit lateral movement generated by hand rotation of the crank handle 108 to move the transport pole 100 leftward or rightward to effect steering of the wrapper 20. Placement of the crank handle 108 extending outward from a corner of the wrapper 20 allows an operator to stand adjacent to the wheel path of the wrapper 20 which is a safer location than standing on the wheel path of the wrapper 20.

Leading end 22 also includes a bale loading deck 140. Deck 140 accepts bales from the front or either side of wrapper 20. The bales are received either on a standard path 50 or an elevated (raised) path 52. Elevated path 52 is provided by a pair of longitudinally oriented tubular supports 144. Tubular supports 144 are rotatably mounted to the framing of deck 140 by riser legs 146. When pivoted into elevated path 52 position, an object (for example, a bale) is elevated so as to be better centered in the hoop assembly 60 when passing through the hoop assembly 60. Elevated path 52 enables the object to be better and more evenly wrapped than if the object is off-center. Additionally, the object may be wider if it is passed through the center because the full diameter of the hoop 60 may then be utilized to admit and wrap the object.

Cylindrical bales may be oriented either longitudinally or in the alternative, transversely, to the path 50 and the hoop 60, if the bale dimensions otherwise accommodate passage through hoop assembly 60. The movement along the path 50 or elevated path 52 is guided by a pair of guide rails 150. Guide rails 150 are longitudinally oriented. Guide rails 150 extend above the deck 140. Guide rails 150 also extend above the longitudinal supports 144 when the elevated path 52 is provided in order to accommodate bales of smaller size or extreme width bales. Guide rails 150 are adjustable by selective pinning of guide rail legs 152*a*, 152*b* which carry the guide rails 150 and are pivoted to the frame 28. Guide rail legs 152*a* are pivotally attached to frame 28 near leading end 22 and guide rail legs 152*b* are pivotally attached to frame 28 near center portion 26 and adjacent to hoop assembly 60. By adjusting the spacing between the guide rails 150, bales of varying sizes can be accommodated and guided along path 50 or elevated path 52.

When a bale is placed on the deck 140, a trigger 160 is depressed which signals the device 20 that a bale is present. If the machine 20 is set to operate automatically, the bale will be pushed toward hoop assembly 60. Trigger 160 can also be extended upward to sense bales received when the riser bars 144 are elevated to provide elevated path 52.

When a bale is present on deck 140, (or above the deck on elevated path 52,) it may be pushed automatically or in response to a manual signal rearward along the path 50 (or elevated path 52) toward hoop assembly 60. This is effected through a transverse pushbar 170, which sweeps over the deck 140 and elevated path 52 and pushes or propels the bale rearward. The bale slides rearward on the deck 140 or the raised longitudinal supports 144 and is guided by rails 150.

A single or final bale may be pushed by an extension assembly 180 carried by pushbar 170. The assembly may be one of two variations. In a first variation, the push-off extension assembly 180 may be a pair of horizontal bars, which pivot at a leading end from push bar assembly 170. To extend such an arrangement, the push-off bars are unpinned, pivoted from a transverse and horizontal orientation, (i.e. parallel to the push bar 170) and into a longitudinal and horizontal orientation extending rearward from the push bar 170. The push-off bars 180 are then pinned to lock them in the extended orientation. When the pushbar 170 is moved rearward, the push-off extension assembly 180 extends into and through the hoop, such that a single or final bale is wrapped by passing through the hoop assembly 60. In this variation, the push-off extension bars have a push end opposite the pivot end attached to the push bar 170.

Figure 6:
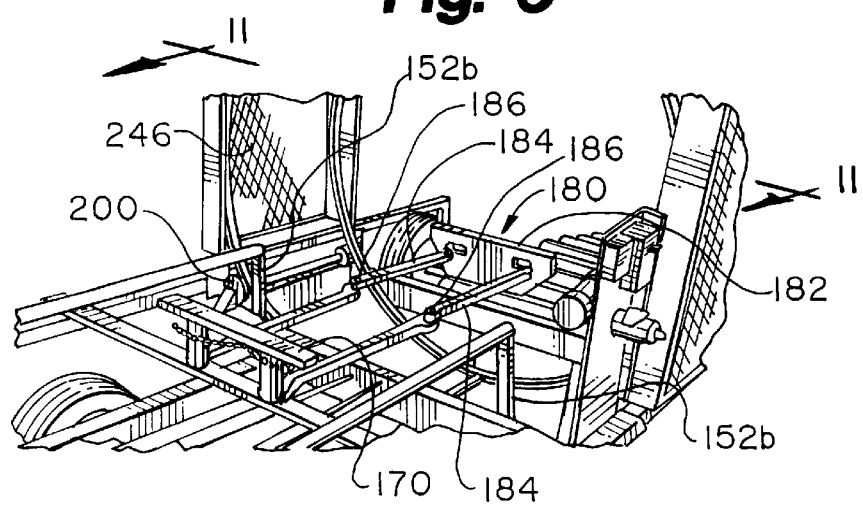
FIG. 6 is an elevated fragmentary perspective view of central portions of the wrapper of FIG. 1, as observed from a slightly elevated position adjacent to a corner of the leading end.
Figure 9:
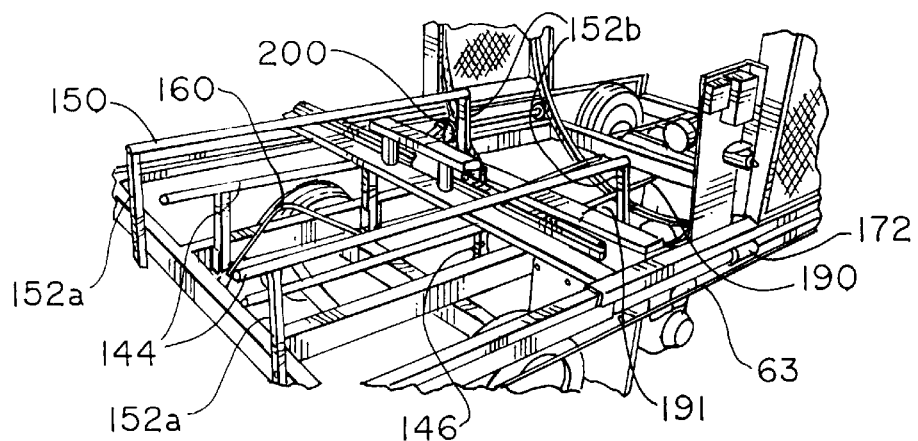
FIG. 9 is an elevated fragmentary perspective view of the wrapper of FIG. 1, from the left corner of the leading end, depicting the leading end, central portion, and the trailing end.
Figure 10:
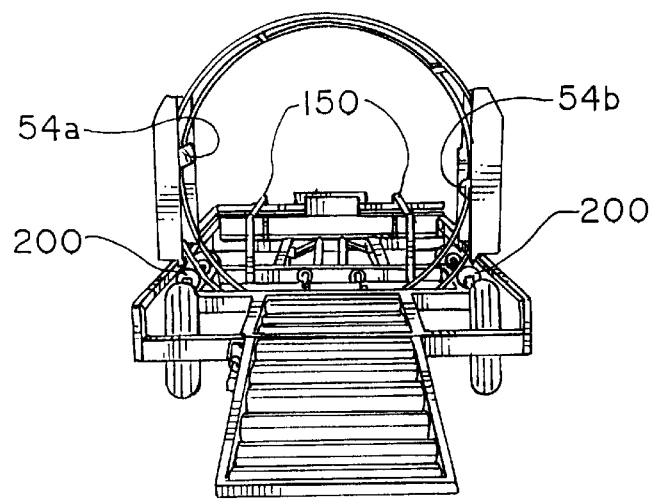
FIG. 10 is another elevated perspective view of the trailing end of the wrapper of FIG. 1.

Alternatively, extension assembly 180 may be more complex. As shown in in FIG. 6, extension assembly 180 may be a transverse pushbar 182 and a pair of jointed legs 184. When central joint 186 is bent, assembly 180 rests against push bar 170. When extended, central joints 186 are straightened. In this variation, it is preferred that the paired legs 184 are coupled through a chain arrangement such that legs 184 extend or retract simultaneously. Thus, transverse pushbar 182 is maintained in a longitudinal orientation as it is manually extended rearward from the pushbar 170. Extension assembly 180 is lockable in either extended (shown in FIG. 6) or retracted configuration (shown in FIG. 9).

Push bar 170 is moved by a hydraulic ram and cylinder 172. Preferably, the hydraulic system is designed for about a 7 foot movement. However, in a most preferred operating mode, not all of the available travel is utilized, as it may be limited by controls to save time and energy.

Central Portion

As a bale travels along path 50, it is supported through hoop assembly 60 by a pair of forks 190 which are inserted into sockets 191 at the rear of deck 140 and extend through a lower portion of hoop assembly 60. Forks 190 terminate slightly above the rear bale support 39. The rear bale support has transversely arranged rollers. When support bars 144 are employed to provide an elevated path 52, forks 190 are removed from the sockets 191 in the rear of deck 140 and inserted in similar sockets 192 in the rear of the support bars 144. This provides support at a higher elevation and more near the center of hoop assembly 60 such that a smaller or wider bale is better centered in hoop assembly 60.

Hoop assembly 60 is carried and supported by an idler assembly 200 on each side of the frame 28. Preferably, the paired idler assemblies 200 are spaced apart a large fraction of the diameter of the single hoop assembly. Preferably, the idler assemblies 200 have a forward and rearward expansion or head which serves to keep hoop assembly 60 from shifting forward or rearward as it rotates. Hoop assembly 60 is driven by a powered rubber wheel 202 bearing against inside edge of hoop assembly 60. Wheel 202 is urged by a spring against a diamond tread pattern on inside edge to improve traction. Hoop assembly 60 is provided with an anti-reverse mechanism to facilitate installation or replacement of plastic film or sheeting rolls. Pre-tensioning assemblies are present for both film rolls 54a, 54b.

Trailing End

A brake mechanism 220 is provided in the form a plate which bears against one or preferably both of the rear wheels 36, 38 rather than bearing against the ground as a skid plate which is a less effective design taught in the prior art. Preferably, the plate engages the outer circumference of the ground engaging wheels 36, 38. The plate is hydraulically actuated against wheel 36, 38. Preferably, brake mechanism 220 is hydraulically linked to the hydraulic control of ramp 40. Most preferably the arrangement of the hydraulic control of these two components 40, 220 is such that brake 220 is released prior to ramp 40 being lifted into the travel position. This arrangement prevents an operator from accidentally towing the wrapper 20 after raising ramp 40 but neglecting to release brake mechanism 220. However, brake mechanism 220 may be separately released without actuation of ramp 40 (i.e. without ramp 40 being lifted into travel position). When the device 20 is being used to wrap a series of bales, the bales exiting ramp 40 tend to force wrapper 20 to move forward. Application of brake mechanism 220 when wrapper 20 is being used on a bale series encourages tighter bale-to-bale contact in the series of wrapped bales by allowing the forward movement of wrapper 20 to be selectively altered.

Figure 7:
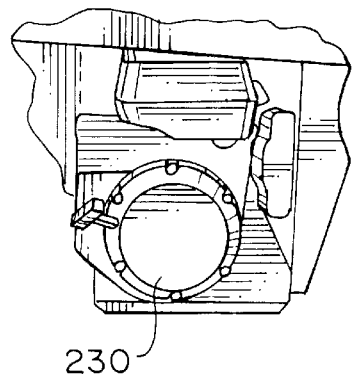
FIG. 7 is a fragmentary view of the power source mounted on the frame of the wrapper of FIG. 1.
Figure 8:
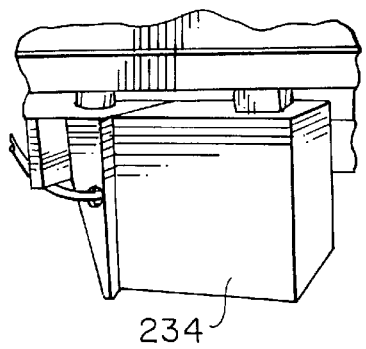
FIG. 8 is a fragmentary view of a portion of the hydraulic system of the wrapper of FIG. 1.

Wrapper 20 is preferably self-powered, for example by an electric start gas engine 230 as shown in FIG. 7. Typically such engines may also be started manually. Engine 230 also includes a fuel shut off which is automatically enabled when the key for the engine is removed from the ignition. Engine 230 may also have a hydraulic throttle advance which accelerates engine 230 when additional power demands occur. Engine 230 drives an alternator and a hydraulic pump. A large hydraulic fluid reservoir 234 is also provided.

Electrical controls are mounted in a panel 240 on the side of wrapper 20. The controls include a manual mode switch 241, an automatic mode switch 242 and a start/reset switch 244. An adjustment termed "flow control" is also provided to suitably adjust rotation rate of the hoop to travel speed of the bale through hoop assembly 60. In manual mode, the pusher bar 170 may be actuated by a signal from its switch. In manual mode, hoop assembly 60 may be actuated to revolve by a signal from its switch. The switch signal actuates drive wheel 202 to rotate against the inner edge of hoop assembly 60 causing the hoop assembly to revolve by rolling on the idlers 200. Sheeting is pulled from opposed rolls of film 54a, 54b and wrapped about an object, such as a bale, passing through revolving hoop assembly 60. The dispensed film becomes a helical pattern of overlapping sheeting on the object. If the object is a bale or preferably a series of bales, it will be deposited on the ramp 40 and proceed down the incline of ramp 40 to the ground. Bales, or a series of bales wrapped together, may then remain on the ground and be protected from weather.

In automatic mode, the pushbar motion, or more precisely pushbar position, is sensed by a set of three switches adjustably mounted on frame 28 adjacent pushbar 170. Actuation of the forward or leading switch signals that the pushbar 170 has reached its forward-most point of travel. A signal from the forward switch causes the pushbar to stop and await a signal, either from the manual-push bar switch or the trigger/start bar to begin another push. The center switch signals that the pushbar 170 is in appropriate position to begin rotation of hoop assembly 60. The trailing switch signals that the pushbar 170 has reached a desired extent of rearward travel and should return to the forward-most position (i.e. adjacent the forward end of deck 140.) The signal from the trailing switch also causes rotation of hoop assembly 60 to cease. Actuation of either the pushbar 170 to move rearward or rotation (i.e. wrapping) by hoop assembly 60 can accelerate engine 230. Actuation of the trailing switch can cause a throttle back or idling engine condition. The three switches may be slid along a shared track and locked in place at desired locations to accommodate a particular bale shape and dimension. Shortening the push bar stroke to only what is needed saves time, plastic film, and fuel. Wrapper 20 also may be optionally provided with remote control 250. Remote control 250 enables electromagnetic radiation such as a radio or infrared system to control wrapper 20. Thus, even greater efficiency is attained by eliminating the need for an operator to frequently return to the control panel.

Safety is increased by a protective cage 246 on each side of hoop assembly 60. Safety of operation is further increased by safety cable 63 extending about most of the periphery of wrapper 20. A slight pull or tug on the safety cable 63 stops all operation of the hydraulics of wrapper 20, thus immediate activity to correct any problem may be undertaken by an operator.

Because numerous modifications may be made to this invention without departing from the spirit thereof, the scope of the invention is not to be limited to the embodiments illustrated and described. Rather, the scope of the invention is to be determined by appended claims and their equivalents.

We claim:

1. A bale wrapper comprising:

a frame, the frame including:

a leading end with steerable wheels and a transport pole connected to the steerable wheels;

a trailing end with braked wheels; and a central portion between the leading end and the trailing end; a bale-loading deck adjacent the leading end, the bale-loading deck including:

a pair of spaced-apart guide rails;

a pair of tubular supports located generally between the spaced-apart guide rails, the tubular supports rotatably mounted to the frame by paired riser legs, defining in a first position a standard path and defining in a second position, an elevated path; and a hydraulically powered pushbar for translating a bale on either the standard path or the elevated path toward the trailing end;

a hoop assembly, wherein the hoop assembly comprises a pair of hoops of substantially equal diameter spaced a desired distance apart on the frame and wherein the hoop assembly includes two opposed rolls of plastic film, the hoop assembly carried and supported by and between a first idler assembly mounted on one side of the frame and a second idler assembly mounted on the opposite side of the frame, the hoop assembly having an inner edge and a powered rubber wheel bearing against the inner edge; and means to simultaneously power the hydraulic pushbar and rotate the powered rubber wheel to rotate the hoop such that film is dispensed from the opposed rolls and wrapped about a bale being translated by the pushbar through the hoop.

2. The bale wrapper of claim 1, wherein the transport pole is telescopic between an extended towing position and a retracted manual steering position and further comprising:

a screw crank, the screw crank mounted transversely on the frame adjacent the leading edge and attachable to the transport pole to laterally pivot the transport pole such that an operator may steer the bale wrapper to define a wheel path whilst the operator avoids occupancy in the wheel path.

3. The bale wrapper of claim 1 and further comprising:

three frame mounted switches to detect respectively, a forward travel limit position of the pushbar, a hoop assembly rotation initiation position of the pushbar, and a rearmost travel limit position of the pushbar.

4. A bale wrapping machine comprising a wheeled frame having a bale-receiving deck, a bale-wrapping device and a roller bed sloping down to ground level, the bale-receiving deck comprising a pair of tubular supports along which a bale can be translated into the bale-wrapping device, a hydraulic ram device for translating the bale along the tubular supports, the tubular supports located generally between a pair of spaced-apart guide rails, the tubular supports rotatable mounted to the frame by paired riser legs, defining in a first position a standard path and defining in a second position an elevated path, the bale-wrapping device being located between the bale-receiving deck and the roller bed and comprising a hoop assembly through which bales can be translated by the hydraulic ram device, the hoop assembly including a hoop carried and supported by a spaced apart pair of idler assemblies, one of each of the pair located on opposing sides of the frame, the hoop rotatable relative to the frame, a reel for plastic strip carried by the rotary hoop and drive means for the hoop assembly.

* * * * *